US008201687B2

(12) United States Patent
Zeliff et al.

(10) Patent No.: US 8,201,687 B2
(45) Date of Patent: Jun. 19, 2012

(54) TABLET PC COVER WITH STOWABLE INPUT DEVICE

(75) Inventors: Zachary Joseph Zeliff, Kerrville, TX (US); Alisa Vladimirovna Kutsel, Taipei (TW)

(73) Assignee: ATOZ Design Labs Co., Limited, Hong Kong (HK)

( * ) Notice: Subject to any disclaimer, the term of this patent is extended or adjusted under 35 U.S.C. 154(b) by 4 days.

(21) Appl. No.: 12/765,836

(22) Filed: Apr. 22, 2010

(65) Prior Publication Data

US 2011/0259788 A1 Oct. 27, 2011

(51) Int. Cl.
*B65D 85/00* (2006.01)

(52) U.S. Cl. ............... 206/320; 206/45.24; 206/45.2

(58) Field of Classification Search ............ 379/433.07; 361/FOR. 106, 679.01, 156, 679.02; 206/320, 206/701, 45.24, 45.2; 40/479, 748
See application file for complete search history.

(56) References Cited

U.S. PATENT DOCUMENTS

| | | | | | |
|---|---|---|---|---|---|
| 5,241,303 | A | * | 8/1993 | Register et al. | 345/168 |
| 5,329,712 | A | * | 7/1994 | Keller | 40/747 |
| 5,375,076 | A | * | 12/1994 | Goodrich et al. | 361/679.17 |
| 5,436,792 | A | * | 7/1995 | Leman et al. | 361/679.44 |
| 5,586,002 | A | * | 12/1996 | Notarianni | 361/679.26 |
| 7,502,225 | B2 | * | 3/2009 | Solomon et al. | 361/679.41 |
| 7,542,052 | B2 | * | 6/2009 | Solomon et al. | 345/659 |
| 2005/0052831 | A1 | * | 3/2005 | Chen | 361/680 |
| 2006/0028791 | A1 | * | 2/2006 | Huang et al. | 361/683 |

* cited by examiner

*Primary Examiner* — Mickey Yu
*Assistant Examiner* — Chun Cheung

(57) ABSTRACT

A cover for a tablet PC provides protection to the body while allowing free access to a touch screen and other controls. The cover has an integrally connected keyboard or other input device which can be simply deployed for use, allowing conventional keyboard- or other-based input to the PC. When not in use the input device can be stowed at the rear of the cover, complementing device protection thereto. The cover further provides support elements allowing the PC to be situated for use on a horizontal surface, with the actual angle of situation adjustable to meet individual needs. When not needed or for transport, the support elements collapse and are received within the cover. In addition, the cover allows the PC to be situated, with the input device deployed or otherwise, in either a landscape or portrait orientation.

14 Claims, 9 Drawing Sheets

TABLET PC COVER WITH STOWABLE INPUT DEVICE

BACKGROUND OF THE INVENTION

1. Field of the Disclosure

The disclosure relates to computer accessories, and more specifically, to a cover for a tablet PC with an integral stowable input device.

2. Description of the Related Art

With recent innovations in touch screen function and application development, tablet PCs are experiencing a dramatic surge in popularity.

A popular tablet PC provides all the functions of a standard desktop or notebook PC, but, rather than relying on a keyboard and mouse for data input and operation control, provides full access through touch screen function integrated into the display.

While certain available applications provide a virtual on-screen keyboard allowing basic input of text characters, response and behavior of the simulated keyboard is severely limited, rendering everyday use of the tablet PC impractical. One solution to this problem has previously been to provide a docking station for the tablet with attached or integral keyboard. Such solution, however, negates the portability advantage of the tablet PC. While portable keyboards are available, accompanying transport of these devices with the tablet again compromises convenience.

Finally, many currently produced tablet PCs offer the advantage of easy alternation between the portrait viewing aspect (height exceeding width) often associated with tablet PCs, and a landscape aspect (width exceeding height) more familiar to users of popular widescreen flat panel displays. Even deployment in the described docking stations rarely provides a choice between display aspects.

Thus, what is called for is a solution addressing the described limitations.

BRIEF DESCRIPTION OF THE DRAWINGS

The invention can be more fully understood by reading the subsequent detailed description and examples with references made to the accompanying drawing, wherein.

DETAILED DESCRIPTION OF THE INVENTION

Figure 1:
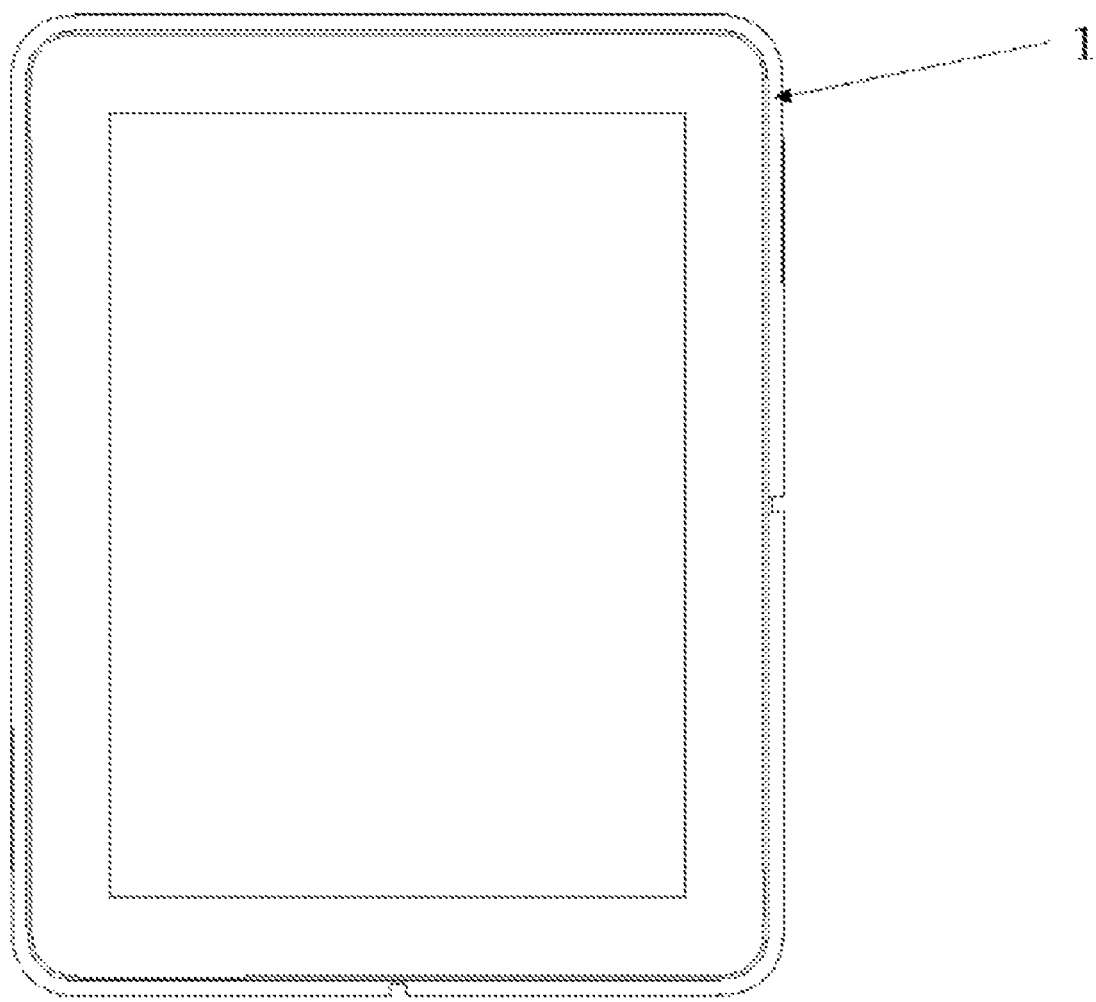
FIG. 1 is a schematic front view of a tablet PC cover as disclosed, with an input device stowed for transport

As shown in FIG. 1, a cover 1 as disclosed for a tablet PC is formed to snugly fit and conform to the body of the PC, with the touch-enabled display and any onboard controls exposed for standard access. The cover 1 is formed of molded silicon, rubber, or any suitable material providing a requisitely tight fit with sufficient thickness to safeguard the PC from external shock or impact, without any significant increase in volume of the device. Preferably the material used additionally provides a pliant, grippable surface.

The tablet PC cover 1 as disclosed includes, fitted therein, an embedded plug (not shown) compatible and aligned precisely with at least one external connection jack on the surface of the tablet PC, the jack configured to enable input to or output from the PC. The embedded plug is at least connected to a wiring route, also embedded in the cover, connecting to an integral input device. Additionally, an identical jack may further be installed in the cover and open to the exterior, connected in parallel to the embedded plug, allowing "pass through" connection of external devices to the tablet PC in addition to the integral input device.

Figure 2:
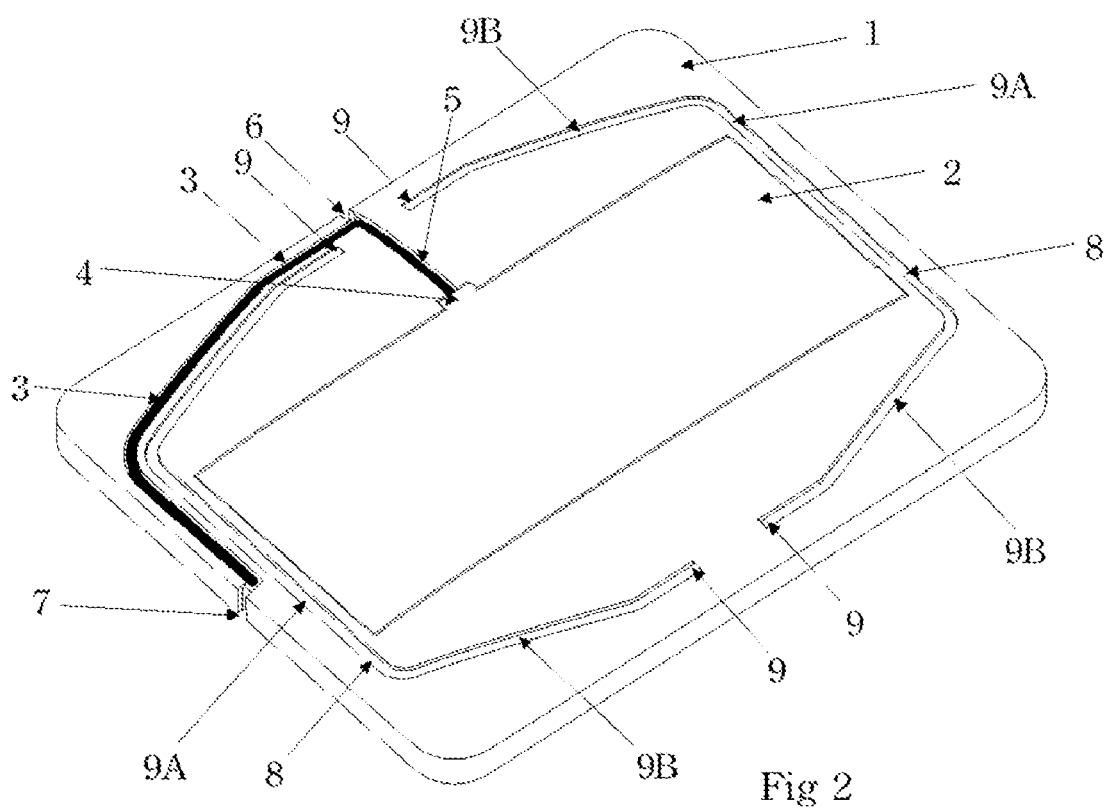
FIG. 2 is a schematic rear view of a first embodiment of a tablet PC cover as disclosed, with an input device stowed for transport.

FIG. 2 is a schematic rear view of a first embodiment of a tablet PC cover as disclosed, with an input device 2 stowed for transport. As shown, the input device 2 is connected to the tablet PC cover 1 by a connecting cable 3, providing input and output capabilities, the connecting cable 3 cable originating at a connecting hub 4, and here stowed in a cable trough 5 in which are formed a first trough break 6 and a second trough break 7. Further included in this embodiment are two support elements 8, each hinged at two ends 9 thereof and each comprising, in this embodiment, one segment 9A formed between two segments 9B.

The input device 2, shown here as a keyboard, stows for transport in a cutout formed in the rear of the tablet PC cover 1. The input device 2 comprises an operating side, here comprising a keypad (not shown), and underside (in operation, the bottom of the input device). When stowed for transport as shown, the underside presents as a portion of the rear face of the tablet PC cover 1. In order to provide an uninterrupted surface, the input device 2 is of a thickness substantially equaling that of the material constituting the rear face of the tablet PC cover, whereby, when stowed, the underside of the input device 2 fits flush with the rear face of the tablet PC cover 1.

The input device 2 is fixed within the cutout in the rear face, as shown, of the tablet PC cover 1 by at least the elastic force of the constituent material thereof. The input device may additionally comprise a continuous or partial flange or distributed tabs along the edge thereof (not shown) to further enhance integrity of the fit thereof in the cutout. Removal of the input device 2 from the cutout is accomplished by simple application of force exerted along one side of the cutout, compressing the elasticity and distorting the dimension thereof, whereby the side of the input device 2 corresponding to the distorted side can be removed, followed by the remainder of the input device 2. Replacement of the input device 2 into the cutout, conversely, is accomplished by, again, application of force exerted along one side of the cutout, compressing the elasticity and distorting the dimension thereof, whereby the sides of the input device 2 not corresponding to the distorted side can be replaced, followed by the last side of the input device 2.

The input device may further comprise at least one angling member (not shown) in the underside thereof, such a member deployable to allow the input device 2 to be situated at a desirable angle for use. When stowed for transport, the at least one angling member collapses into a recess formed in the underside of the input device 2, maintaining the uninterrupted surface thereof.

Input device 2 connects to tablet PC cover 1 by a connecting cable 3 originating at a connecting hub 4 providing input and output capabilities. Connecting hub 4 provides a clearance barrel (not shown) or other means by which the connecting cable 3 can be rotated freely without kinking or twisting. Shown here stowed for transport, connecting cable 3 is nested in cable trough 5, secured by the elasticity of the tablet PC cover material. A first trough break 6 is formed in cable trough 5 substantially midway along a long side of tablet PC cover 1 and a second trough break 7 is formed in cable trough 5 substantially midway along an adjacent short side of tablet PC cover 1. In operation, when input device 2 is deployed in a landscape orientation, connecting cable 3 is drawn out of cable trough 5 from the cutout to first trough break 6, which allows connecting cable 3 to exit cable trough 5 while remaining securely nested therein past that point. When input device 2 is deployed in a portrait orientation, connecting cable 3 is drawn out of cable trough 5 from the cutout, past first trough break 6, to the second trough break 7, which allows connecting cable 3 to exit cable trough 5 while remaining securely nested therein past that point.

In this embodiment, as shown in FIG. 2, two support elements 8 are disposed on the rear face of tablet PC cover 1, each hinged at two base ends 9 thereof. The support elements are essentially segmented U-shaped, preferably metal brackets of a gauge sufficient to support the weight of the tablet PC and retain their shape, such shape comprising at least three straight lengths as shown. When stowed for transport, the support elements 8 are nested in dedicated grooves formed in the rear face of the tablet PC cover 1. Further, the two ends of the support elements 8 terminate in ends 9 hinged to the rear face of the tablet PC cover.

Figure 3:
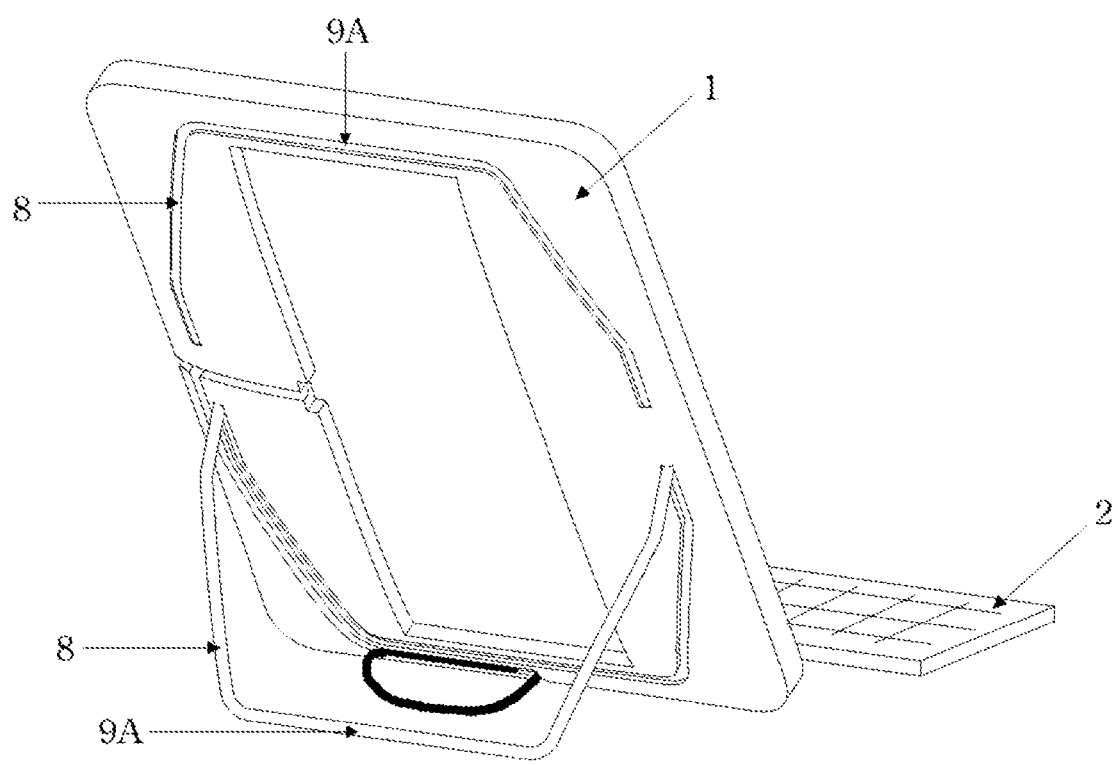
FIG. 3 is a schematic rear view of the tablet PC cover of FIG. 2, with an input device extracted for use and support members extended, the tablet PC deployed in a portrait orientation.

As shown in FIG. 3, when a tablet PC with the first embodiment of the tablet PC cover as disclosed is deployed in a portrait orientation, at least one of the support elements 8 is hinged away from the back face of tablet PC cover 1. When the base (in this orientation, a short side) of the tablet PC is placed on a horizontal supporting surface, the tablet PC can be angled back until it rests on the at least one segment 9A, parallel to the horizontal supporting surface. The tablet PC is thus fully supported in a substantially angled upright position for viewing and use.

Figure 4:
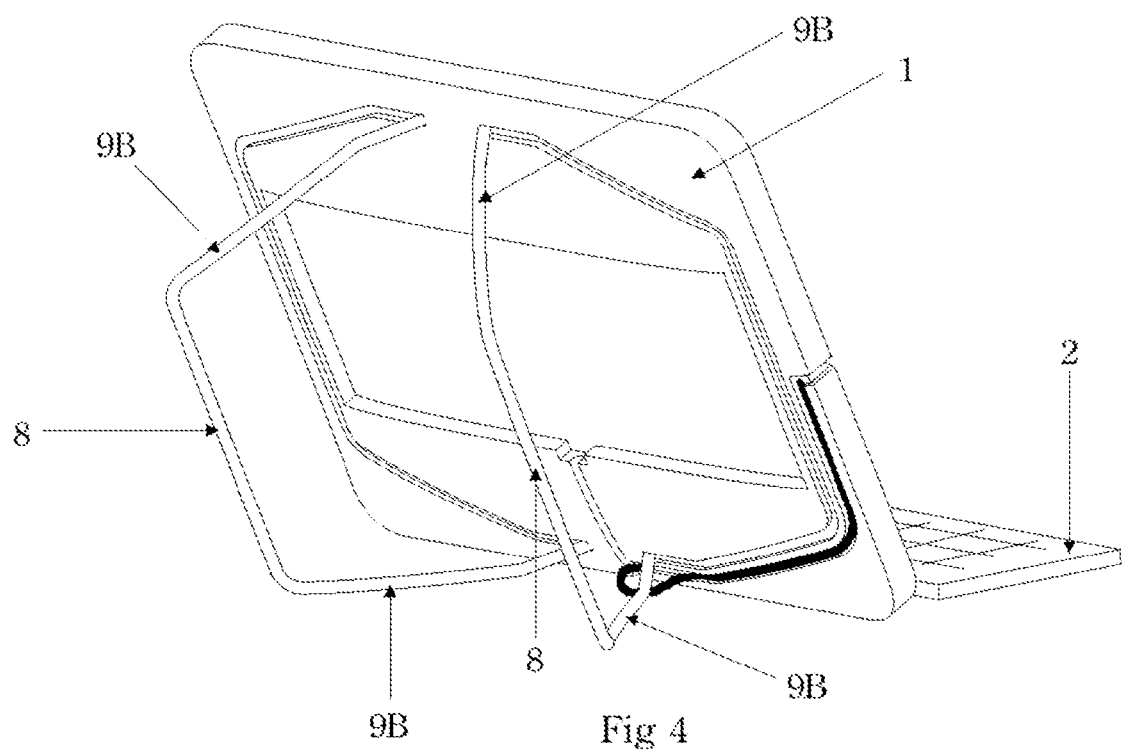
FIG. 4 is a schematic rear view of the tablet PC cover of FIG. 2, with an input device extracted for use and support members extended, the tablet PC deployed in a landscape orientation.

As shown in FIG. 4, when a tablet PC with the first embodiment of the tablet PC cover as disclosed is deployed in a landscape orientation, at least one of the support elements 8 is hinged away from the back face of tablet PC cover 1. When the base (in this orientation, a long side) of the tablet PC is placed on a horizontal supporting surface, the tablet PC can be angled back until it rests on the at least one segment 9B, parallel to the horizontal supporting surface. The tablet PC is thus fully supported in a substantially angled upright position for viewing and use.

It should be noted that, while two support elements 8 are described in this embodiment as a preferred complement, the disclosure is by no means limited thereto, and the application of one, three, or more like support elements can be utilized while remaining well within the sprit of the disclosure.

Figure 5:
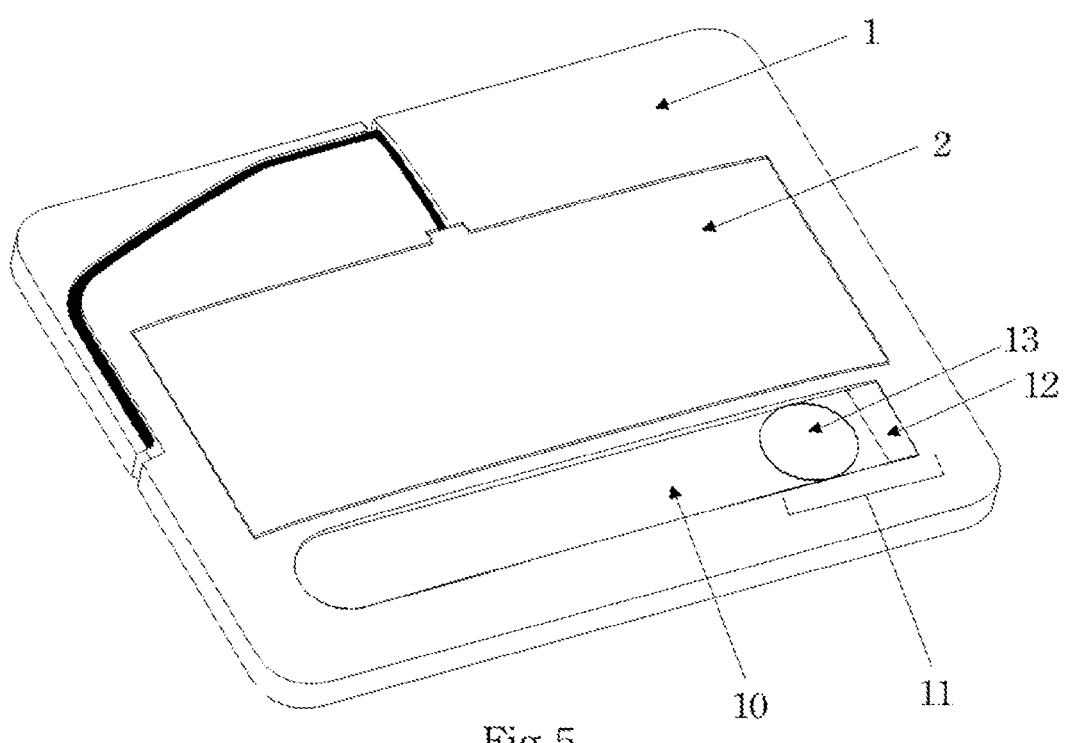
FIG. 5 is a schematic rear view of a second embodiment of a tablet PC cover as disclosed, with an input device stowed for transport.

FIG. 5 is a schematic rear view of a second embodiment of a tablet PC cover as disclosed, with an input device 2 stowed for transport, differing from the previous embodiment only in that a support element 10 is utilized rather than support elements 8.

Support element 10 comprises a flat, longitudinal, essentially tongue-shaped member. Support element 10 is preferably light metal or other material of sufficient rigidity to fully support the tablet PC when deployed as described while maintaining a profile thin enough to not protrude beyond the surface of the rear face of the tablet PC cover when stowed for transport, with no appreciable weight burden imposed.

When stowed for transport, support element 10 is received in a dedicated bay in the rear face of tablet PC cover 1, maintained therein by the elastic force of the tablet PC cover material. Support element 10 comprises a hinge and pivot assembly 11 at one end thereof, with a hinge 12 of the hinge and pivot assembly 11 fixed to and hinging on one end of the dedicated bay of the rear face of the tablet PC cover 1. The hinge 12 of the hinge and pivot assembly 11 allows the support element 10 to hinge away from the rear face of the tablet PC cover 1 on a plane perpendicular thereto. A pivot 13 of the hinge and pivot assembly 11 allows the length of support element 10 to pivot along a plane perpendicular to that of hinge 12.

It should be noted that the mechanisms of hinge 12 and pivot 13 can, by way of friction, meshed gears or other means, provide preset gradiation of respective hinge and pivot action, such that fixed positions can be maintained by support element 10 when deployed.

Figure 6:
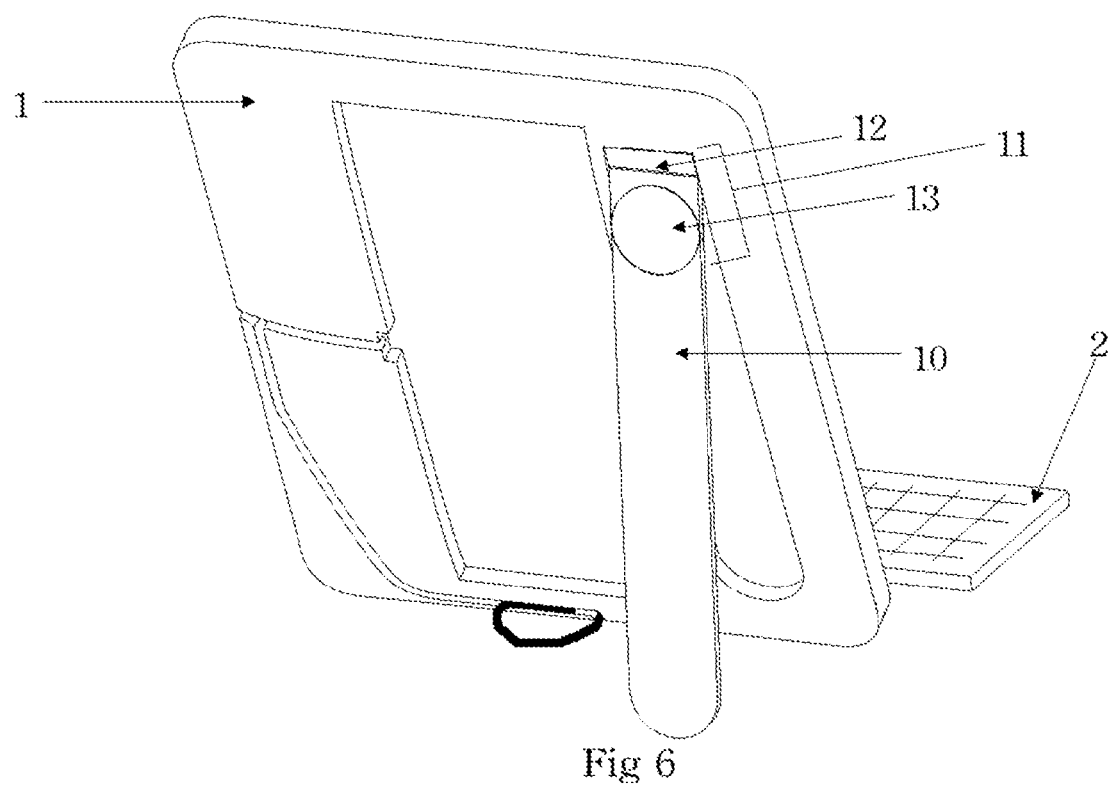
FIG. 6 is a schematic rear view of the tablet PC cover of FIG. 5, with an input device extracted for use and support member extended, the tablet PC deployed in a portrait orientation.

As shown in FIG. 6, when a tablet PC with the second embodiment of the tablet PC cover as disclosed is deployed in a portrait orientation, the support element 10 is hinged away from the back face of tablet PC cover 1. When the base (in this orientation, a short side) of the tablet PC is placed on a horizontal supporting surface, the tablet PC can be angled back until it rests on the distal end of support element 10 which contacts the horizontal supporting surface. The tablet PC is thus fully supported in a substantially angled upright position for viewing and use. It should be noted that, in this configuration, pivot 13 of the hinge and pivot assembly 11 of tablet PC cover 1 is not used, support element 10 remaining straight along its length.

Figure 7:
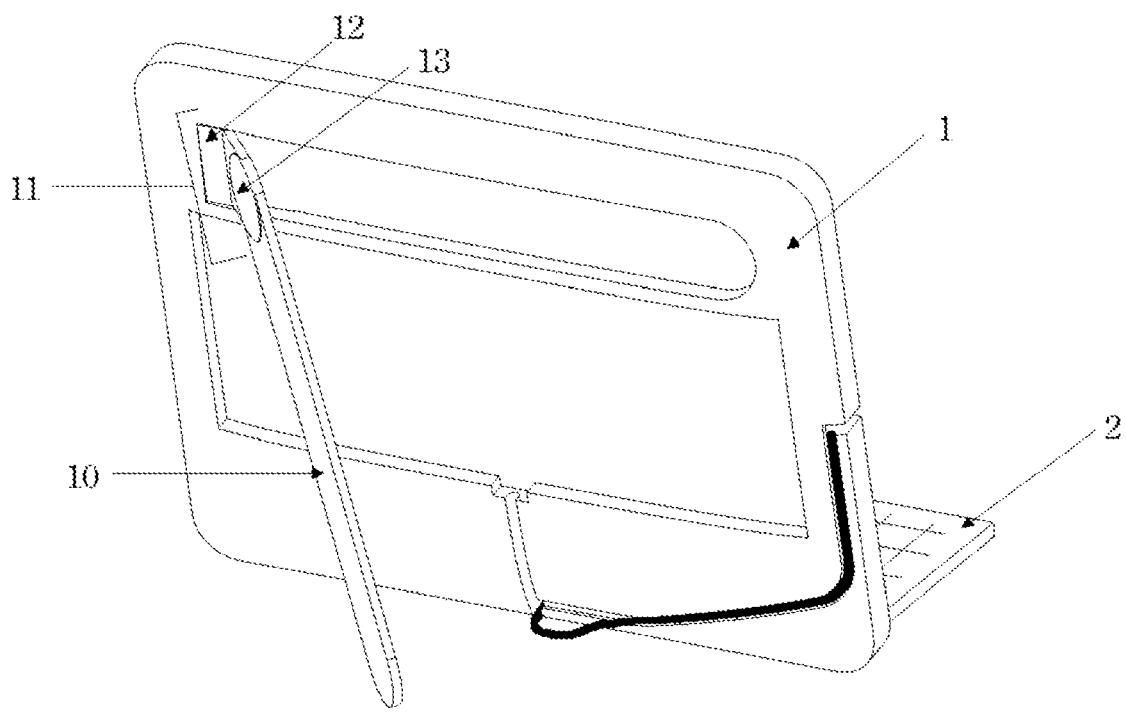
FIG. 7 is a schematic rear view of the tablet PC cover of FIG. 5, with an input device extracted for use and support member extended, the tablet PC deployed in a landscape orientation.
Figure 8:
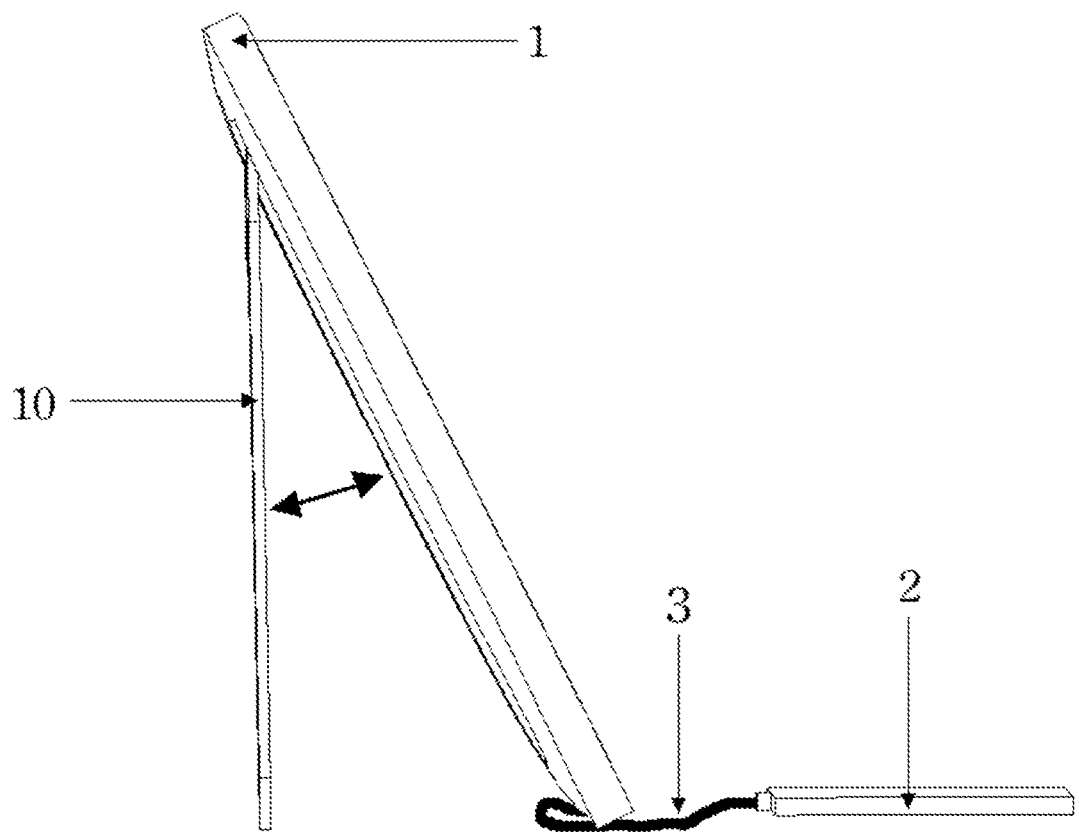
FIG. 8 is a detailed schematic view of a support member hinge and pivot assembly of the tablet PC cover of FIG. 5, showing varying range of deployment of a hinge unit of the hinge and pivot assembly, providing a range of viewing angles in a portrait orientation.
Figure 9:
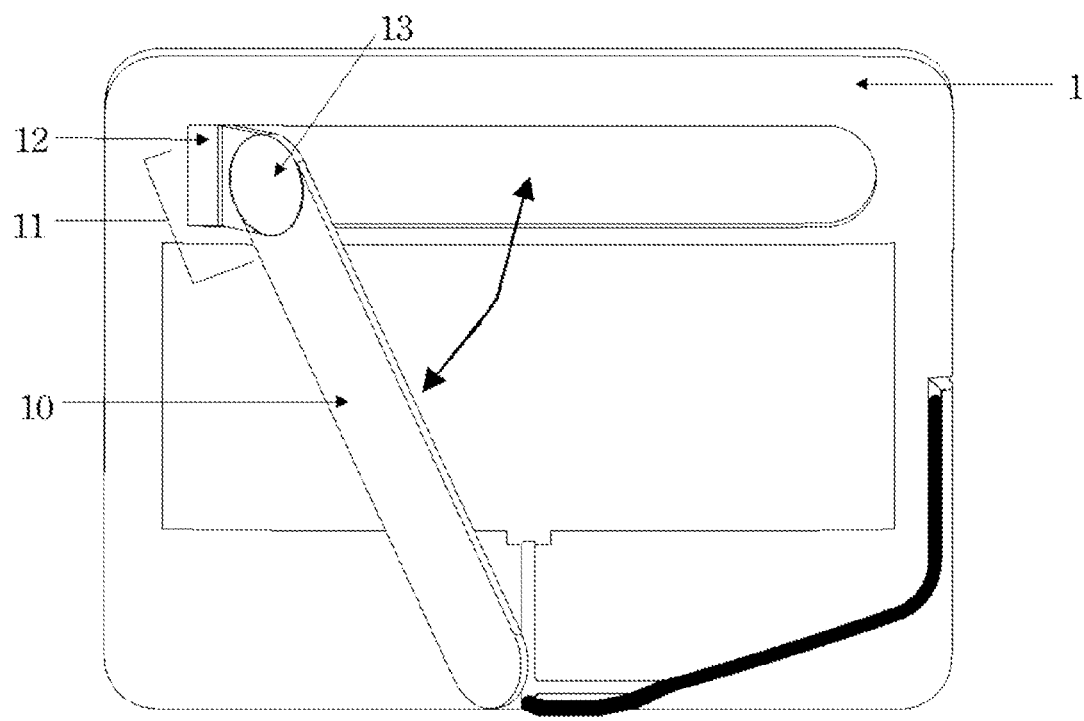
FIG. 9 is a detailed schematic view of a support member hinge and pivot assembly of the tablet PC cover of FIG. 5, showing varying range of deployment of a pivot unit of the hinge and pivot assembly, providing a range of viewing angles in a landscape orientation.

As shown in FIG. 7, when a tablet PC with the second embodiment of the tablet PC cover as disclosed is deployed in a landscape orientation, the support element 10 is hinged away from the back face of tablet PC cover 1 and pivot assembly 11 pivoted. When the base (in this orientation, a long side) of the tablet PC is placed on a horizontal supporting surface, the tablet PC can be angled back until it rests on the distal end of support element 10 which, pivoting downward from the original axis of support member 10, contacts the horizontal supporting surface with a distal end. The tablet PC is thus fully supported in a substantially angled upright position for viewing and use.

It should be noted that, while one support element 10 is described in this embodiment as a preferred complement, the disclosure is by no means limited thereto, and the application of two or more like support elements can be utilized while remaining well within the sprit of the disclosure.

It should further be noted that on/off control of the input device 2 can be provided either by operating application of the tablet PC, when available, or, alternatively, by a manual control provided on the body of the input device 2 or elsewhere on the tablet PC cover 1, such that the input device is disabled when stowed for transport and enabled when deployed for use.

As well, additional input/output capabilities can be provided by suitable connectors positioned on the body of the input device 2. If additional power supply is required for operation of such additional devices, a battery bay can further be provided in the body of the input device 2.

Finally, while the portable input device as disclosed has discussed a keyboard as an example, other input devices such as mouse pointer devices, stylus/writing pad devices, numerical keypads, or other comparable input devices are equally applicable while remaining well within the scope of the disclosure.

The tablet PC cover as disclosed allows users to utilize fully functional input devices to supplement existing touch screen controls with no significant compromise of the tablet PC's portability benefits.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A tablet PC cover comprising:
   a molded body shaped to snugly fit and conform to a body of the tablet PC, exposing a touch-enabled display and any onboard controls of the tablet PC exposed for standard access, and having a rear face opposite to the tablet PC, wherein the rear face has a central portion and a border portion surrounding the central portion and corresponding to edges of the tablet PC;
   fitted in the molded body, at least one embedded plug compatible and aligned precisely with at least one external connection jack on a surface of the tablet PC, the jack configured to enable input to or output from the tablet PC, wherein the embedded plug is at least connected to a wiring route, also embedded in the molded body;
   at least one input device and a corresponding cutout in the rear face of the molded body, the input device stowable in the cutout and connected to the molded body by a connecting cable, providing input and output capabilities, the connecting cable originating at a connecting hub internally connected to the at least one embedded plug, wherein the cutout is formed in the central portion of the rear face of the molded body;
   at least one cable trough in which the connecting cable is nested, secured by the elasticity of the molded body material, in which are formed a first trough break and a second trough break, the cable trough originating at the connecting hub and the first and second trough breaks respectively situated substantially midway along a long side of the molded body and substantially midway along an adjacent short side of the molded body; and
   at least one support element received in a dedicated space defined in the rear face of the molded body, wherein the support element comprises a hinge, a pivot and a leg, the hinge connected to the molded body and spaced apart from the pivot so as to allow the pivot and leg to rotate away from the rear face of the molded body in a first plane, and the leg rotatable on the pivot in a second plane different than the first plane.

2. The tablet PC cover of claim 1, wherein the molded body comprises molded silicon, rubber, or any suitable material providing a requisitely tight fit with sufficient thickness to safeguard the tablet PC from external shock or impact without any significant increase in volume of the device and providing a pliant, grippable surface.

3. The tablet PC cover of claim 1, wherein at least one jack is further installed in the molded body and open to the exterior, connected in parallel to the embedded plug.

4. The tablet PC cover of claim 1, wherein the at least one input device is of a thickness substantially equaling that of the material constituting the rear face of the molded body, and comprises an operating side and underside, and, when stowed for transport, the underside presents as a portion of the rear face of the molded body, such that when stowed, the underside of the input device fits flush with the rear face of the molded body.

5. The tablet PC cover of claim 1, wherein the at least one input device is a keyboard, mouse pointer device, stylus/writing pad device, numerical keypad, or other comparable input device.

6. The tablet PC cover of claim 4, wherein the at least one input device is fixed within the cutout in the rear face of the molded body by at least the elastic force of the constituent material thereof.

7. The tablet PC cover of claim 6, wherein the at least one input device additionally comprises a continuous or partial flange or distributed tabs along the edge thereof to further enhance integrity of the fit thereof in the cutout.

8. The tablet PC cover of claim 1, in which the leg comprises light metal or other material of sufficient rigidity to support the tablet PC when deployed and maintain a profile not protruding beyond the surface of the rear face of the molded body when stowed;
   wherein, when stowed, the support element is maintained therein by elastic force of the molded body.

9. The tablet PC cover of claim 8, in which, when deployed in a portrait orientation wherein a short side of the tablet PC is placed on a horizontal supporting surface, the pivot and leg are rotated away from the rear face of the molded body, and the tablet PC can be angled back until it rests on the distal end of the leg which contacts the horizontal supporting surface without rotation of the leg on the pivot.

10. The tablet PC cover of claim 8, in which, when deployed in a landscape orientation wherein a long side of the tablet PC is placed on a horizontal supporting surface, the pivot and leg are rotated away from the rear face of the molded body and the leg is rotated on the pivot, and the tablet PC can be angled back until it rests on the distal end of the leg which, pivoting downward from the original axis of the support member, contacts the horizontal supporting surface.

11. The tablet PC cover of claim 8, wherein the hinge and pivot assembly can, by way of friction, meshed gears or other means, provide preset gradiation of respective hinge and pivot action, such that fixed positions can be maintained by the support element when deployed.

12. The tablet PC cover of claim 1, wherein on/off control of the input device is provided by operating application of the tablet PC.

13. The tablet PC cover of claim 1, wherein on/off control of the input device is provided by a manual control provided on a body of the input device or elsewhere on molded body.

14. The tablet PC cover of claim 1, wherein additional input/output capabilities are provided by suitable connectors positioned on the body of the input device, wherein if additional power supply is required for operation of such additional devices, a battery bay is further provided in the body of the input device.

* * * * *